(12) United States Patent
Greenfield

(10) Patent No.: US 9,035,948 B2
(45) Date of Patent: May 19, 2015

(54) METHODS AND SYSTEMS FOR DRAWING GRAPHICS INTO A DATA CHART

(75) Inventor: Eliot Seth Greenfield, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2368 days.

(21) Appl. No.: 11/832,941

(22) Filed: Aug. 2, 2007

(65) Prior Publication Data

US 2014/0300603 A1 Oct. 9, 2014

(51) Int. Cl.
*G06T 11/20* (2006.01)

(52) U.S. Cl.
CPC .................................. *G06T 11/20* (2013.01)

(58) Field of Classification Search
USPC .......................................................... 345/440
See application file for complete search history.

(56) References Cited

U.S. PATENT DOCUMENTS

| | | | | |
|---|---|---|---|---|
| 4,674,042 A * | 6/1987 | Hernandez et al. | ........... | 715/209 |
| 4,674,043 A * | 6/1987 | Hernandez et al. | ........... | 715/209 |
| 4,686,522 A * | 8/1987 | Hernandez et al. | ........... | 345/160 |
| 4,739,477 A * | 4/1988 | Barker et al. | ........................ | 1/1 |
| 4,815,029 A * | 3/1989 | Barker et al. | ................. | 715/205 |
| 5,463,731 A * | 10/1995 | Diec et al. | ..................... | 715/777 |
| 5,581,677 A * | 12/1996 | Myers et al. | ................... | 345/440 |
| 5,682,536 A * | 10/1997 | Atkinson et al. | .............. | 717/165 |
| 5,844,572 A * | 12/1998 | Schott | .......................... | 345/440 |
| 5,894,311 A * | 4/1999 | Jackson | ........................ | 345/440 |
| 5,953,009 A * | 9/1999 | Alexander | .................... | 715/771 |
| 5,990,888 A * | 11/1999 | Blades et al. | ................. | 715/764 |
| 6,859,909 B1 * | 2/2005 | Lerner et al. | .................. | 715/203 |
| 6,927,771 B2 * | 8/2005 | Ikami | ............................. | 345/440 |
| 7,212,998 B1 * | 5/2007 | Muller et al. | ............... | 705/36 R |
| 7,512,875 B2 * | 3/2009 | Davis | ............................ | 715/215 |
| 7,584,415 B2 * | 9/2009 | Cory et al. | .................... | 715/215 |
| 7,650,355 B1 * | 1/2010 | Davis | ............................ | 715/202 |
| 7,653,582 B2 * | 1/2010 | Costache et al. | ........... | 705/36 R |
| 2001/0000964 A1 * | 5/2001 | Alexander | .................... | 345/440 |
| 2002/0030683 A1 * | 3/2002 | Alexander | ................. | 345/440.1 |
| 2007/0203720 A1 * | 8/2007 | Singh et al. | ....................... | 705/1 |
| 2007/0203816 A1 * | 8/2007 | Costache et al. | ................ | 705/35 |
| 2007/0247462 A1 * | 10/2007 | Bell et al. | ...................... | 345/440 |
| 2008/0252643 A1 * | 10/2008 | Joseph et al. | ................. | 345/440 |

\* cited by examiner

*Primary Examiner* — M Good Johnson
(74) *Attorney, Agent, or Firm* — Kilpatrick Townsend & Stockton LLP

(57) ABSTRACT

Methods and systems for drawing graphics into a data chart are described. One described method for drawing a graphical element in a chart includes receiving a graphics control call with at least one data value parameter specifying the location of the graphical element One or more operations associated with the graphics control call may be recorded into a data structure. At least one display data range may be determined for the display of data representations and the graphical element, for example by defining an appropriate axis range. The range and data structure may be used to draw and redraw the chart. For example, upon a change to the data, the chart may be redrawn using the new data set and the data structure. As another example, upon a change to a graphical element, the data structure may be changed or replaced and the new or revised data structure used to redraw the chart.

24 Claims, 15 Drawing Sheets

METHODS AND SYSTEMS FOR DRAWING GRAPHICS INTO A DATA CHART

FIELD OF THE INVENTION

The present invention relates generally to charts, including methods and systems for customizing a chart, for example, by drawing graphics into a chart using data value display positions and other characteristics.

BACKGROUND

Various charting packages allow developers to represent a set of data values as graphics, for example, as a set of vertical bars, points in a line, wedges of a pie, etc. Charts typically do this by providing a way of transforming data values into x/y coordinates to display on screen, and then using a standard drawing application programming interface (API) to render those data values in a particular way. Most charting packages examine the data being displayed, and automatically determine an appropriate set of ranges for a chart's axes, for example, to guarantee that all data is visible. Often the chart also needs to take into account how the data will be rendered, for example, if a data point will be rendered as a 30 pixel wide square, the transform needs to ensure there is enough space around that data point to accommodate the 30 pixel square.

Some traditional graphics APIs allow developers to use drawing commands that take x/y screen coordinates as parameters. For example, a developer might use the API to draw a box that stretches from the coordinates 20, 20 to 100, 100. A graphics API also typically allows a developer to set up some sort of transformation on the coordinate space into which the developer is drawing, for example, to take all of the coordinates and move them to the right by 100 pixels, or scale the coordinates up by a factor of two.

Some charting packages allow a developer to use a graphics API to draw, customize, or extend a chart. However, such APIs provide drawing and customizing commands that take only screen-based coordinates as parameters and many developers desire to make customization and drawing graphics that are based on data value display positions and other characteristics. Many developers find it difficult, complicated, and time-consuming to deal with the data value to screen coordinate transformations needed to use the existing API graphic drawing commands.

Development is further complicated when data changes, for example, when a change requires changes to a chart's data range, data representations, and added customizations. For example, such a change may require adjusting display customization characteristics. To ensure the data, representations, graphics, and customizations show up as intended, a developer may: (a) make the chart aware of the data so it can be included when automatically determining how data is transformed into screen coordinates; (b) make the chart aware enough of how the data is rendered that it can account for it when automatically determining how data is transformed into screen coordinates, and/or (c) use the chart's extension APIs to transform data into onscreen coordinates. In short, existing charting packages make it complicated and time-consuming to customize a chart, for example, when drawing chart graphics.

SUMMARY

Embodiments of the present invention provide methods and systems that allow a chart developer to use a drawing API to extend and customize a chart, for example, by customizing data point labels or drawing a horizontal band between two data values to indicate a "target range." The API commands may allow a developer to specify both data value and pixel value parameters, for example to specify drawing object positions, offsets, and other characteristics. The similarity of the drawing commands to traditional drawing commands may be used to facilitate and simplify the customization. Allowing a developer to specify the drawing coordinates using both data values (chart values) and pixel, values adds additional flexibility and may dramatically simplify chart development.

One embodiment of the present invention comprises a method for adding a graphical element to a chart by receiving a graphics control call with at least one data value parameter specifying the location of the graphical element. One or more operations, such as drawing operations, associated with the graphics control call may be recorded into a data structure. The method may further involve determining at least one display data range for the display of data (for example representations of data such as columns in a bar graph) and the graphical element An example of determining a display range is determining an appropriate axis range for one of the chart axes. The display data range and the data structure may he used to draw and/or redraw the chart. For example, upon a change to the chart data, the chart may be redrawn using the new data set and the data structure. As another example, upon a change to a graphical element, the data structure may be changed or replaced and the new or revised data structure used to redraw the chart.

One embodiment of the present invention comprises a method for drawing graphics into a chart of data by receiving a graphics control call comprising (a) at least one data value parameter and (b) at least one pixel value parameter. The at least one data value parameter and at least one pixel value parameter may be used to specify the display of the graphical element in the chart. One embodiment comprises determining at least one display data range for display of the set of data and the graphical element in the data, chart and drawing the chart using the at least one display range.

In other embodiments of the invention, a computer-readable medium (such as a random access memory or a computer disk) comprises code for carrying out these methods. For example, one embodiment is a computer readable medium comprising a data structure for use in drawings graphics into a chart of data, the data structure comprising an identification of a graphical element and an identification of at least one operation associated with display of the graphical element.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
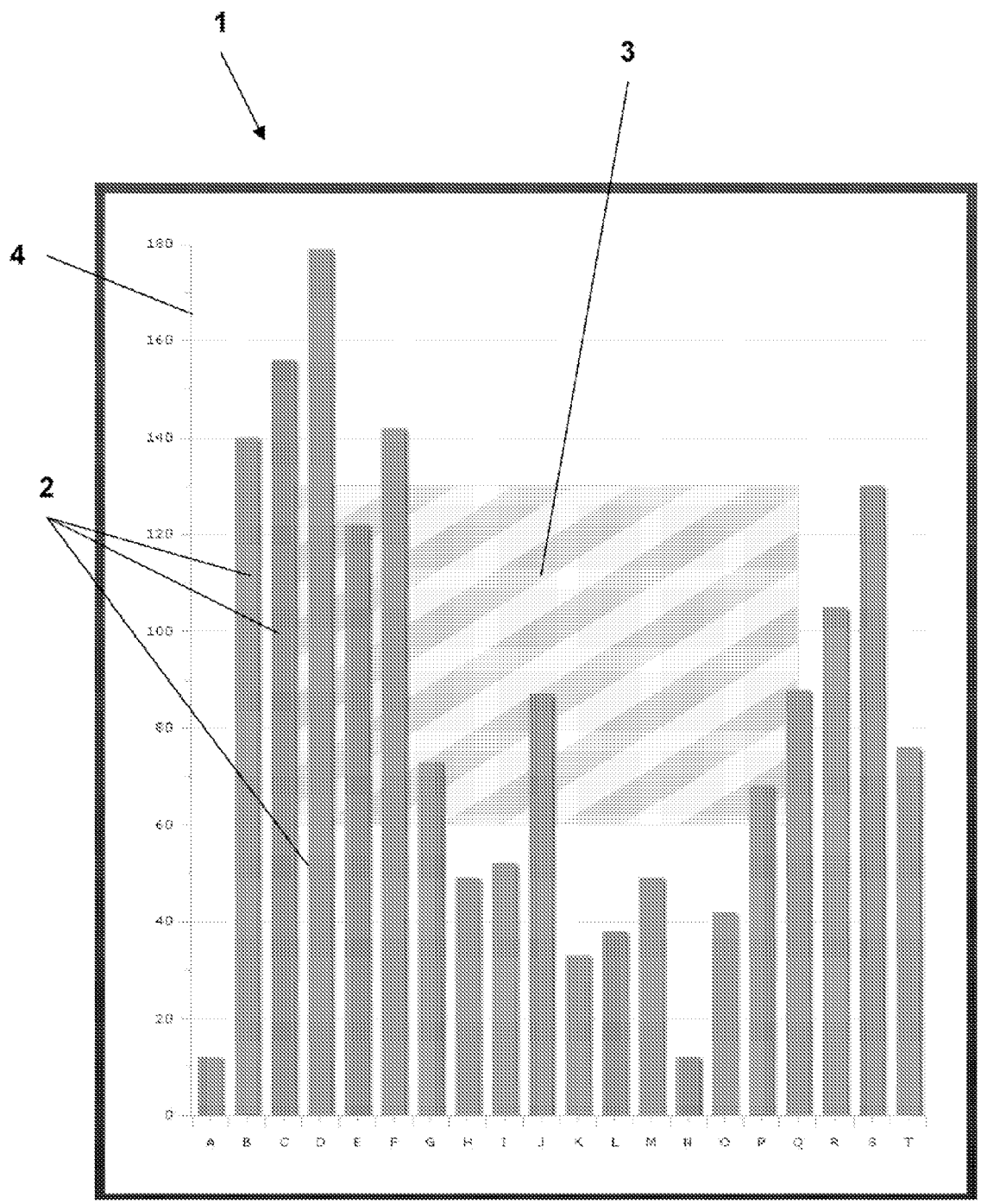
FIG. 1 is an exemplary chart displaying data representations and a graphic according to one embodiment of the present invention.

Embodiments of the present invention provide methods and systems that allow a chart developer to use a drawing API to extend and customize a chart. The invention encompasses a variety of chart development techniques for use in developing charts of varying types. It provides a variety of benefits as illustrated by the following illustrative examples of the uses, benefits, and functions of illustrative embodiments of the present invention.

Illustrative Chart Customization

In one embodiment of the present invention, a chart developer uses a drawing API to create a chart. In this case, the API allows the developer to define various charting controls. The chart developer uses a chart control to define a chart component, an axis control to define the chart axes, and a series control to define a series of data points for representation on the chart. For example, the developer may specify a series using a reference to a data set, such as the following data set:

| X | Y |
|---|---|
| A | 12 |
| B | 140 |
| C | 156 |
| D | 179 |
| E | 122 |
| F | 142 |
| G | 73 |
| H | 49 |
| I | 52 |
| J | 87 |
| K | 33 |
| L | 38 |
| M | 49 |
| N | 12 |
| O | 42 |
| P | 68 |
| Q | 88 |
| R | 105 |
| S | 130 |
| T | 76 |

The chart developer may further use a graphics control to specify a graphic. The API may provide graphics controls providing a plurality of graphic drawing functions. Exemplary controls and functions include: DataDrawingCanvas, addDataChild, updateDataChild, clear, beglnFill, beginBitmapFill, lineStyle, endFill, moveTo, iineTo, dashedLine, curveTo, drawRect, drawEllipse, drawRoundedRect, mapChildren, positionChildren, etc. In this example, the developer uses the drawRect function to specify a box in the background of the data item representations.

The drawRect control for example could be defined in a library as a public function drawRect(left:*,top:*,right:*,bottom:*) with the four noted parameters. The developer provides the following script to specify the display of the box using the drawRect graphics control:

```
public function drawData( ):void {
    var bmp:Bitmap = new stripeClass( );
    canvas.clear( );
    canvas.lineStyle(2,0xAAFFAA,1,false,"normal",null,
    JointStyle.MITER);
    var m:Matrix = new Matrix( );
    m.rotate(45);
    canvas.beginBitmapFill(bmp.bitmapData,undefined,undefined,m);
    canvas.drawRect(leftVal.selectedItem,topVal.value,
    rightVal.selectedItem,bottomVal.
    value);
    canvas.endFill( ); }
<HBox>
    <Label text="left:" />
    <ComboBox change="drawData( );" id="leftVal" selectedItem="C"
    dataProvider="{categories.category.@name}" />
    <Label text="right:" />
    <ComboBox change="drawData( );" id="rightVal" selectedItem="Q"
    dataProvider="{categories.category.@name}" />
</HBox>
<HBox>
    <Label text="top:" />
    <NumericStepper value="130" change="drawData( );"
    id="bottomVal" minimum="–400"
    maximum="400" />
    <Label text="bottom:" />
    <NumericStepper value="60" change="drawData( );" id="topVal"
    minimum="–400"
    maximum="400" />
</HBox>
```

When the development application renders the chart (which may occur on an on-going basis as the chart is being developed), it uses the data value parameters provided for the rectangle (left=C, top=60, right=Q, bottom=130) to draw the rectangle. Exemplary rendering code for the drawRect control follows:

```
case DRAW_RECT:
    left = cache.x(data(params.left)) + offset(params.left);
    top = cache.y(data(params.top)) + offset(params.top);
    right = cache.x(data(params.right)) + offset(params.right);
    bottom = cache.y(data(params.bottom)) + offset(params.bottom);
    g.drawRect(left, top, right − left, bottom − top);
    break;
```

The above portion of drawing code above shows how a rectangle could be drawn. The coordination of the actual screen coordinates of the rectangle may be accomplished using additional coding. For example, such coordination may involve code that (a) uses the axes to convert the data values provided in the call to drawRect( ) into numeric values; (b) informs the axes of those numeric values, and that they should be included when generating the displayed range of the chart, and/or (c) uses the axes to convert, those numeric values into screen coordinates, after the axes have determined the displayed range of the chart. After such additional coding is executed, the actual drawing code included above may be executed, which uses the finally computed screen coordinates (in the cache) to draw.

Referring now to the drawings in which like numerals indicate like elements throughout the several figures, FIG. 1 is an exemplary chart displaying data representations and a graphic according to one embodiment of the present invention. FIG. 1 illustrates a chart 1 showing data item representations 2 and a box 3 defined by the chart developer. Note that various features of the chart 1 maybe selected automatically by the development application but may subsequently be adjusted by the chart developer or may be automatically adjusted as the developer modifies the chart 1 or underlying data set.

Figure 2:
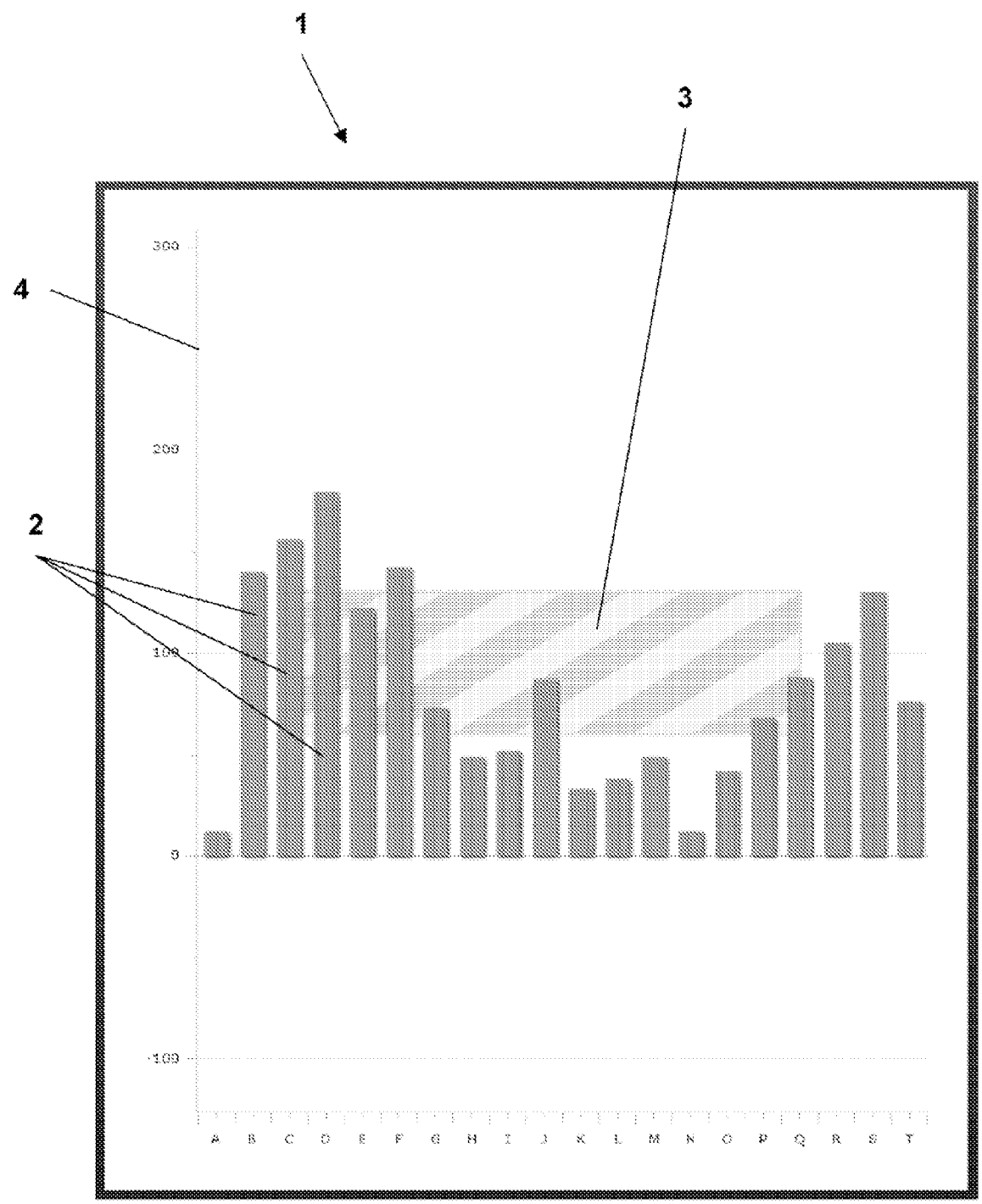
FIG. 2 is the exemplary chart of FIG. 1 after adjustment of the vertical axis according to one embodiment of the present invention.

FIG. 2 illustrates the chart of FIG. 1 with a different scale for the vertical axis 4. The developer may have specified a change in the vertical axis 4 and the chart renders the data representations 2 and the box 3 in their new locations. Because the developer specifies the location of the box 3 using data values (as opposed to pixel coordinates alone), changing the vertical axis 4 does not require the developer to manually reposition the box 3. The position of the data values and the rendering engine knows to redraw the chart 1 based on the new data value positions.

This illustrative example is given to introduce the reader to the general subject matter discussed herein. The invention is not limited to this example. The following sections describe various additional embodiments and examples of methods and systems for drawing graphics into a data chart.

Illustrative Chart Development Environment

Figure 3:
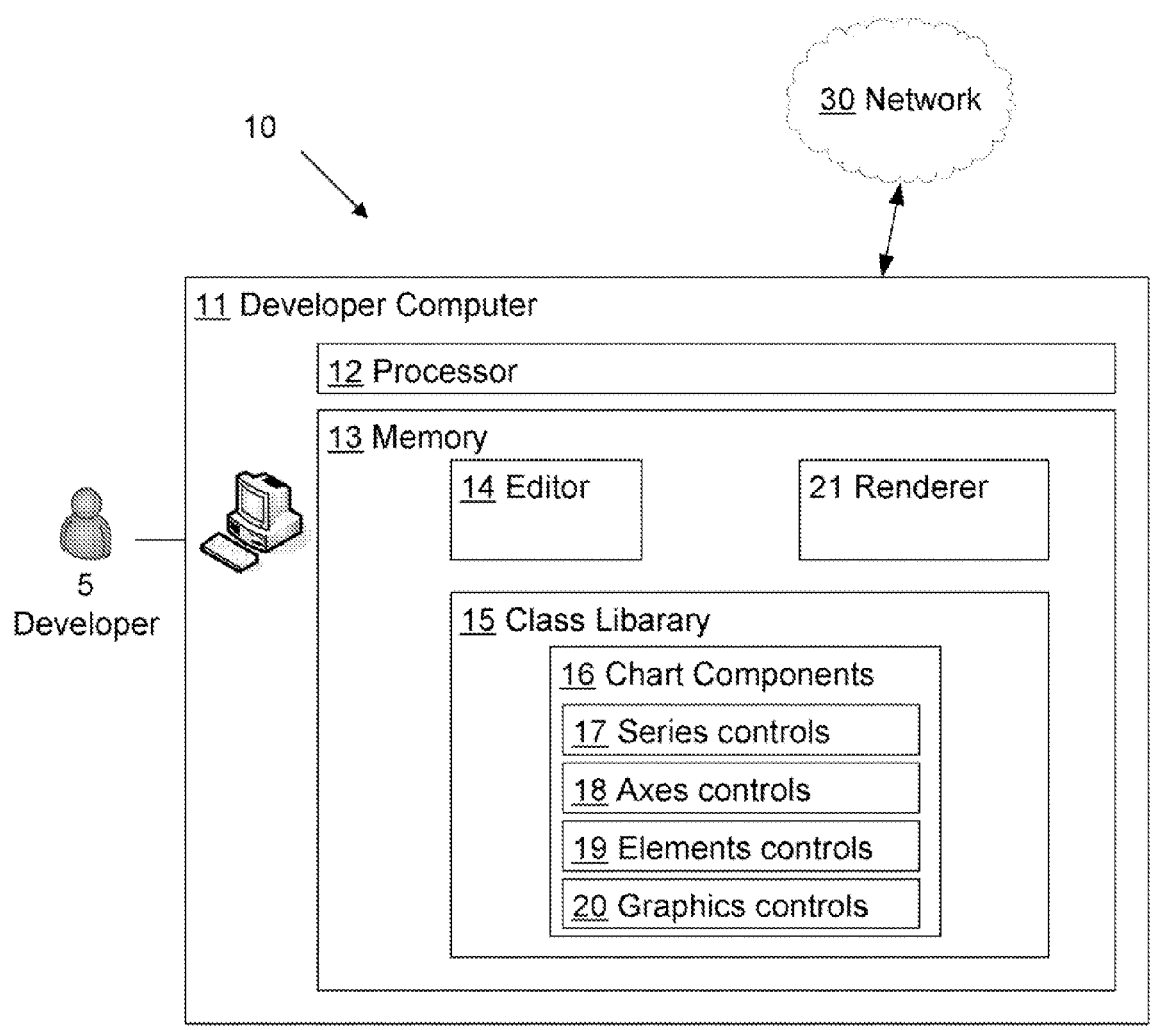
FIG. 3 is a system diagram illustrating an illustrative chart development environment according to one embodiment of the present invention.

FIG. 3 is a system diagram illustrating an illustrative chart development environment 10 according to one embodiment of the present invention. Other embodiments may be utilized. The environment 10 shown in FIG. 3 comprises a development computer 11. The development computer 11 comprises a computer-readable medium, such as a random access memory (RAM) 13, coupled to a processor 12 that executes computer-executable program instructions stored in the memory 13. Such a processor 12 may comprise a microprocessor, an ASIC, a state machine, or other processor, and can be any of a number of computer processors, such as processors from Intel Corporation of Santa Clara, Calif. and Motorola Corporation of Schaumburg, Ill. Such processor 12 may comprise, or may be in communication with, media, for example computer-readable media, which stores instructions that, when executed by the processor 12, cause the processor 12 to perform the steps described herein.

Embodiments of computer-readable media comprise, but are not limited to, an electronic, optical, magnetic, or other storage or transmission device capable of providing a processor with computer-readable instructions. Other examples of suitable media comprise, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. A transmission device may store the code on computer-readable medium temporarily. The instructions may comprise code from any suitable computer-programming language, Including, for example, C, C++, C#, Visual Basic, Java, Python, Perl, and JavaScript.

The developer computer 11 may be connected to a network 30 such as the Internet. In other embodiments, other networks, such as an intranet, or no network may be used. Moreover, methods according to the present invention may operate within a single device or with components distributed over a network 30. The computer 11 may also comprise a number of external or internal devices such as a mouse, a CD-ROM, DVD, a keyboard, a display, or other input or output devices. Examples of computing devices are personal computers, digital assistants, personal digital assistants, cellular phones, mobile phones, smart phones, pagers, digital tablets, laptop computers, Internet appliances, and other processor-based devices. In general, a computer device executing a development application may be any type of processor-based platform that operates on any operating system, such as Microsoft® Windows® or Linux, capable of supporting one or more client application programs. Other applications can also be contained in memory 13 and can comprise, for example, a word processing application, a spreadsheet application, an e-mail application, a media player application, an instant messenger application, a presentation application, an Internet browser application, a rich Internet application player, a calendar/organizer application, and any other application or computer program capable of being executed by the device.

An illustrative development machine 11 is a developer's client machine. As an example, a developer might develop a chart or application containing a chart on development machine 11 on a client device and then move it to a web server so that a user and/or another developer can access it.

A developer could use a development application comprising an editor 14, a library 15, and a renderer 21 to create a chart. The editor 14 may allow a developer to create or specify a chart using declarative code, such as XML code, and/or to graphically design a layout that automatically generates such declarative code. The developer may use the renderer 21 to render or compile the declarative code with procedures from the library 15 to generate a chart or application containing a chart. The compiling may involve first converting the declarative code into procedural script and compiling the procedural script, possibly with additional procedural script from the library or elsewhere, into an executable application, such as a rich Internet application or other chart containing application.

The class library 15 may comprise various functional components, for example a chart component for use in creating one or more different types of charts. A chart component 16 or a charting package may comprise a series component 17 (line series, column series—a chart with one series of data in it representing that area), axes controls 18, elements controls 19, and graphics controls 20. An axes control 18 may be used to configure the axes of a charting component. For example, a chart developer could use an axes control to specify that the horizontal axis of a chart includes specific categories, for example, the American states. A graphics control may be used by a developer to draw a graphic into the chart. For example, the developer may draw a line from "New York" to "California," using the American states defined along a horizontal axis. As another example, the developer may highlight everything in the chart from January 1$^{st}$ to January 30$^{th}$, using the dates defined along an axis.

In certain embodiments, the graphics controls aspect of the API allows a developer to use whatever type of data a chart is representing as data values passed or used by the graphics controls (for example, as parameters to the data graphics API controls). Note that the various controls 17, 18, 19, 20 may interact with one another as appropriate. For example, a graphics control may call or otherwise use an axes control or a series control. That abstraction is typically handled by the individual axis object. Many, but not all, charts will comprise a horizontal axis and a vertical axis.

Certain embodiments of the present invention relate to methods of developing a chart. It will be recognized that the development environment of FIG. 3 is merely one context and that other features of the invention are described herein. For example, certain embodiments will not involve a network, certain embodiments will not involve the use of declarative code, certain embodiments will not involve a rich Internet application, and certain embodiments will not involve a library. In short, the techniques for charting and the other features described herein have uses in a variety of contexts, not to be limited by the specific illustrations provided herein. It should also be noted that embodiments of the present invention may comprise systems having different architecture than that which is shown in FIG. 3. For example, in some systems according to the present invention, one or more server devices may provide some or all of the development environment. The system shown in FIG. 3 Is merely illustrative and is not intended to recite any system component or feature as essential or necessary to any embodiment of the invention.

Embodiment of a Graphics Control Call with Data Value and/or Pixel Value Parameters In one illustrative embodiment of the present invention, a charting component is provided to a chart developer. The charting component allows the developer to specify a chart and graphics for inclusion on the chart by specifying the graphics locations with data value and/or pixel value parameters. The charting component takes responsibility for the other steps necessary to render it correctly, without the developer having to address any data transformations that may be necessary. In this embodiment, the charting component records the graphic that the developer has drawn. As the details of the chart change, a graphics subpart of the chart component informs the chart what it needs to know to ensure that the developer's drawings are included in the chart. For example, it may respond to changes in the chart's ranges and update the chart accordingly.

One embodiment of the present invention provides a typical drawing API to a developer for graphically drawing onto a chart. The developer may do so by identifying drawing coordinates, for example two corners of a box. Each coordinate that is passed to the drawing API can be a pixel value (for example a pixel offset), a data value (the corner of a box), or a combination data value and pixel valsie. The drawing API may maintain a data structure based on the developers commands. For example, it may record a list of drawing operation codes (op-codes), representing the set of commands issued by the developer. It may also maintain coordinates, for example data value and pixel value coordinates, for both the vertical axis and the horizontal axis. When a developer calls a new drawing API, the drawing API may extract any included coordinates from the command, and add the command to the end of the op-codes.

When new data or a new graphic is added to a chart, the charting component may need to regenerate its ranges/transforms. To do so, the charting component uses the relevant data and graphic element coordinates that need to be included in the ranges as well as pixel offsets that may be specified or determined. Once the ranges/transforms are used to convert its data values from a set of data into pixel values on the chart, the charting control uses the data structure to draw the graphic element on the chart. For example, the drawing API executes the stored op-code list, replaying the drawing API in the order invoked by the developer, using the final transformed screen coordinates that represent the data/pixel values originally passed by the developer.

In one embodiments, the present invention provides an extension to a chart drawing development package that allows a developer that may be familiar with how drawing APIs work (but not necessarily familiar with the details of how charting packages do data, transformation) to draw graphics into a chart. The developer is able to use traditional drawing API commands which are enhanced to convert data values into screen coordinates without the developer having to deal with any transformation. For example, a developer may want to draw a rectangle stretching across a chart from $1 million to $2 million. The developer can use the enhanced drawing features of this embodiment of the present invention to do exactly that by simply providing a command to draw a rectangle stretching from one million dollars to two million dollars. In contrast, traditional drawing APIs will have draw functions, for example draw a line, fill rectangle, draw oval, draw text, that require specifying horizontal and/or vertical positions in pixel position values.

Thus, one embodiment of the present invention provides a similar or identical API offering functions to draw a line, draw a rectangle, fill rectangle, draw text, etc., but allows the developer to provide coordinates in the data space (as opposed to pixel coordinate space alone). Behind the scenes, the charting package monitors data values and manages all the transformation. Thus, in the example above, the charting package or component does the transformation of $1 million to a screen coordinate and makes sure that the chart ranges include the draw so that the rectangle or a portion of it does not end up off the screen. This management further ensures the Intended display of the rectangle when the ranges in the chart, changes, for example because new data is added, to adjust the developer specified graphic to match the new ranges of the chart.

In one embodiment, the chart package will offer an API which looks identical to a traditional packaged API, but different in that the parameters are data values as opposed to screen coordinates. When a developer calls an API instead of actually drawing directly to the screen, the component records op-codes or macros for the set of drawing commands that the developer executes with the associated data values. When, for example, a developer provides a command to draw a line from left to right, the charting component populates a data structure with numeric values which represent those operations. Such a data structure may record one or more commands that draw a line and the data values associated with the line. The use of this type of data structure allows the development environment to function as a retain mode system, meaning that the developer need only specify drawing commands once and the drawing commands are retained and automatically modified as the chart is changed. For example, if the chart size changes or if new data gets added to the chart, the developer does not have to redefine the chart.

The developer providing the drawing commands may also signal that there is new data to be displayed in the chart. The chart determines data value display ranges by checking what ranges are needed for every sub-piece or sub-component of the chart, for example, the ranges of the data needed to display the data representations and the range needed to display the graphical element. The graphics sub-component may identify a range of data needed to display a graphical element by stepping through the data structure, recorded for the graphical element, for example, by looking at the op-codes and the data values. The graphics sub-component may also account for a margin, border, or other display characteristic to improve the graphical element display. For example, the graphics sub-component may determine that a box from $1 million to $2 million should have a 20 pixel margin around it to make sure that a border gets included in the chart ranges. Such a margin, border, or other display characteristic may be specified by the developer or automatically determined.

Once chart data value display ranges have been determined, the chart is drawn. The data item representations (for example, representations of items in a data set) may be positioned and displayed on the chart. The graphic element defined by the developer may also be positioned on the chart. In one embodiment of the present invention, the data structure is used to draw the graphical element. The graphic sub-component, using the data value display ranges that have been determined, goes through the op-codes of the data structure to draw the graphic. This may involve conversion of the data value parameters to the pixel values appropriate for the data value display ranges.

In one embodiment, the data structure is used to facilitate the retain model character of the development environment, so that the developer can expect the chart, to automatically reposition graphics when the chart changes. For example, if the user resizes a window containing a chart and the size of the chart has to change, the recorded data structure allows the chart to react to the fact that the chart has changed and redraw the graphic without the developer's attention. The chart can essentially recalculate its ranges and the data structure can replay the op-codes to draw the graphic in its intended location. Note that resizing the chart could be specified by a developer or caused by an end user. The data structure may be used in either case to ensure appropriate display of the graphic element.

Illustrative Embodiment of a Graphics Control Call

Figure 4:
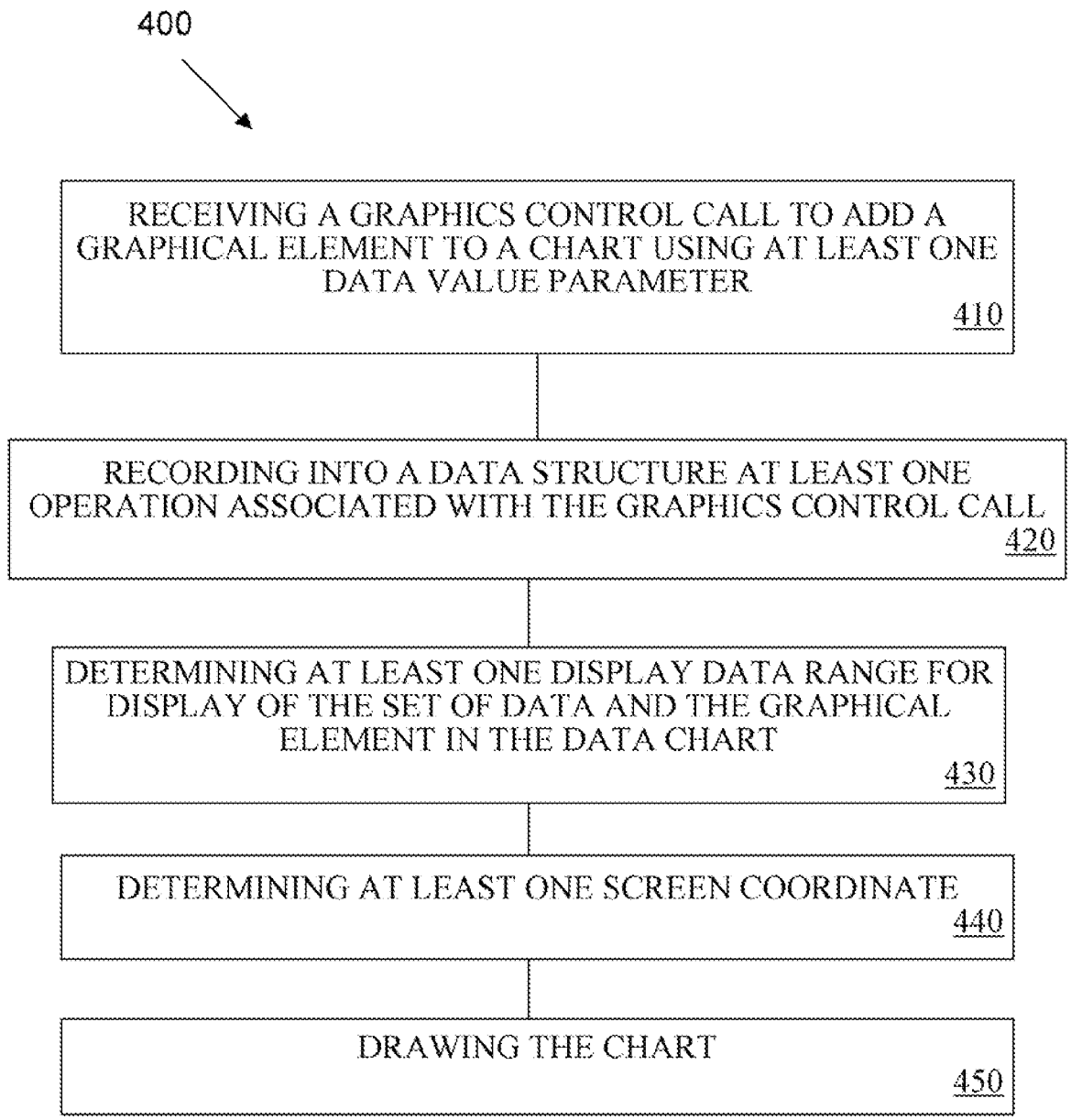
FIG. 4 is a flow chart illustrating one method of drawing graphics into a chart according to one embodiment of the present invention.

FIG. 4 is a flow chart illustrating one method 400 of drawing graphics into a chart according to one embodiment of the present invention. For purposes of illustration only, the elements of this method are described with reference to the development environment depicted in FIG. 3. A variety of other implementations are also possible.

In the method 400 shown in FIG. 4, an editor 14 in a chart development environment 10 receives a graphics control call to add a graphical element to a chart using at least one data value parameter, as shown in block 410. For example, a developer may have made a call to a drawing API specifying one or more data values to be used to determine the location of the graphical element to a chart displaying a set of data. The chart development environment 10 may automatically receive or recognize the call to add the graphical element as the call is entered into editor 14 or may recognize or otherwise receive the call upon the occurrence of some event, for example, rendering of the chart during testing or execution of the chart or application containing the chart. A chart control call may specify the display of the set of data in the chart.

After receiving the graphics control call, the graphics control component 20 or any other suitable component of development environment or system 10 records into a data structure at least one operation associated with the graphics control call, as shown in block 420. The data structure may include on or more op-codes and/or the parameter data values. The data structure may have a list format comprising numerical representations of commands and data or may have any other suitable format. The data structure may be stored in memory.

The data structure may also include a combination of data values and pixel values. The pixel values may have been provided as part of the graphics control call or may be determined automatically by the development environment 10. For example, a command to draw a circle may specify the center of the circle using a data parameter and the radius of the circle using a pixel parameter. As a specific example, the command may be to draw a circle with a center at "New York" on the horizontal axis and 98 degrees on the vertical axis and that the circle will have a 30 pixel radius. An exemplary data structure could include one or more op-codes for drawing a circle with a center identified by those data values and with a radius identified by that pixel value.

The charting component 16 or any other suitable component of the development environment 10 determines at least one display data range, as shown in block 430. This may involve using the set of data item, the graphical element, and any other appropriate feature of the chart useful in determining appropriate data ranges. In the case where it is a charting component of functional feature of the environment makes this determination, it may have been done in response to notice that either the data has changed or a graphic has changed or been added. In the case of a graphics control call to add a graphical element, a graphics control sub-component 20 may Inform the chart, component 16 that there is new data to be displayed. In response, the chatting component 20 may ask its sub systems 17, 18, 19, 20 to describe the data ranges needed for each subcomponent and then, based on this information, determine appropriate data ranges. In certain embodiments, these are referred to as the chart's optimal ranges. For example, the charting component 16 does not determine ranges from zero to ten million dollars when all of the values it needs to show fall within zero and ten dollars. As part of the determination of at least one data range, shown in block 430, the graphics subcomponent may determine the data range needed for its graphics. For example, the graphic subcomponent may examines the data structure, the stored op codes and/or the data values to report back a desired range.

As an example, a developer may provide commands to draw boxes on a chart having dollars shown on a vertical axis. The developer may provide a command to draw a box that vertically is going from $10 to $20 and a command to draw a another box that vertically goes from $90 to $100. The charting component 16 may looks at each element inside of it, which may be other things besides the box graphics including data representations. With respect to the boxes, the graphics subcomponent 20 identifies the ranges for the boxes—from 10 to 20 and 90 to 100—and returns that it requires a vertical range that goes from $10 to $100. However, the graphics system may also account for borders, margins, and other display characteristics. For example, it may identify that each box requires a 10 pixel border and report that the vertical range needed is from $10 to $100 dollars with 10 pixels above and below it. The charting component 20 then takes the information from the graphics and other subcomponents and figures out its data ranges, for example the ranges of one or more of its axes. In the present example, the chart may use an algorithm to compile the information and determine appropriate ranges, for example it may round the vertical axis range to go from $0 to $110.

While determining the at least one display data range is described here as a multi-step, multi-component process, it need not be. For example, a single component could be used to determine appropriate display data ranges. Generally, such ranges may be determined in any suitable manner that takes into account what is being displayed. The determination may also involve rounding and other human considerations and preferences. Note that a display range may be the axis of a chart and that such an axis may comprise numeric, non-numeric, or custom-defined axis values. Note further that a chart may comprises two or more axis and that a data range may be determined for each axis.

After determination of a display data range, method 400 may further comprise determining at least one screen coordinate, as shown in block 440. For example, such a screen coordinate may be determined for using the at least one display data range corresponding to the data value recorded in the data structure. As further example, if axes objects are used to determine the displayed range of a chart, this step 440 may comprise using a block of code that further uses the axes objects to convert numeric values into screen coordinates. This step 440 may be combined with the actual drawing of the chart described herein.

The method 400 may further comprise drawing the chart using the at least one display range and the data structure, as shown in block 450. In the multi-component example used herein, this may involve the charting component 16 calling its subcomponents 17, 18, 19, 20 to draw their respective chart features. For example, the graphic subcomponent 20 may be called to draw the graphics defined by the graphics control call. The graphics subcomponent 20 then walks through the data structure, for example a list of op codes and data values, and now that the display data ranges have been determined, can convert the data values of the data structure and/or other op-code commands into pixel values. Drawing the graphic element may involve use of pixel-based and other display characteristics, for example a pixel value may be used to specify a box border width that is used when drawing the box.

This process can be essentially repeated each time a developer attempts to add a new graphical element to a chart. Note that graphical elements include, but are not limited to, lines, shapes, text, photos, images, bitmap graphics, vector graphics, buttons, lists, comments, and any other suitable elements or objects that are graphical in nature or that can be inserted and/or added at a location in a chart. In addition, anytime the data ranges of the chart are required to be changed, the chart can be redrawn without requiring the developer to reposition or adjust graphical elements. The graphical elements may simply and automatically be redrawn using the new data ranges and the data structure. For example, the chart and its associated graphical elements are redrawn in appropriate positions when the chart changes size, has new or real-time data added, or otherwise changes its axes data ranges.

For example, the method 400 may further comprise receiving a change to the data set, determining at least one changed display data range reflecting the change to the data set, and drawing a changed chart using the at least one changed display data range and the data structure. As another example, method 400 may further comprise receiving a change to the graphics control call, recording into a changed data structure at least one operation associated with the change to the graphics control call, determining at least one changed display data range using the change to the graphics control call, and drawing a changed chart using the at least one changed display range and changed data structure.

Illustrative Embodiment Using Data Value and Pixel Value Parameters

Figure 5:
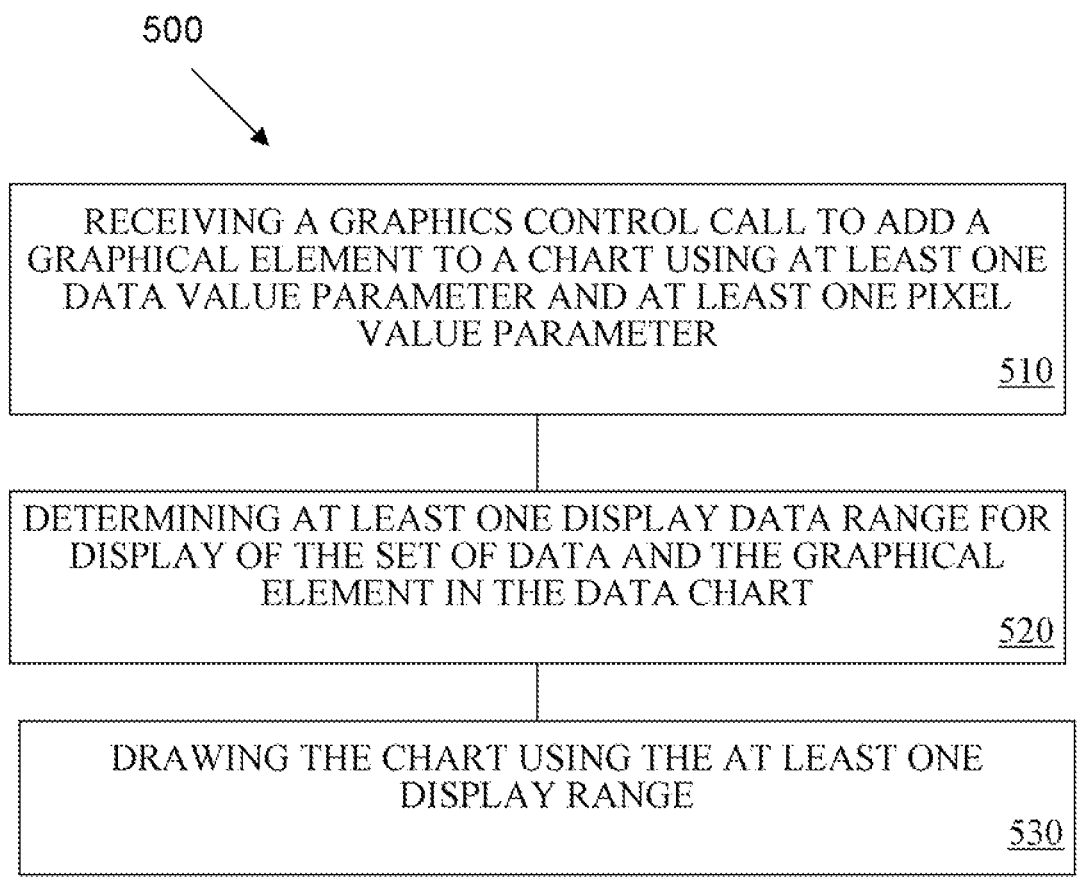
FIG. 5 is a flow chart illustrating one method of drawing graphics into a chart according to one embodiment of the present invention.

FIG. 5 is a flow chart illustrating one method 500 of drawing graphics into a chart according to one embodiment of the present invention. For purposes of illustration only, the elements of this method are described with reference to the development environment depicted in FIG. 3. A variety of other implementations are also possible.

In the method 500 shown in FIG. 5, an editor 14 in a chart development environment 10 receives a graphics control call to add a graphical element to a chart using at least one data value parameter and at least one pixel value parameter, as shown in block 510. For example, a developer may have made a call to a drawing API specifying one or more data values and one or more pixel value parameters to be used to determine the display of the graphical element. For example, a command to draw a circle may specify the center of the circle using a data parameter and the radius of the circle using a pixel parameter. As additional examples the at least one data value parameter and/or pixel value parameter may specify a corner, a center, or other location aspect of the graphical element as well as the size, width, radius, buffer, or other display characteristic of the graphical element in the chart.

The charting component 16 or any other suitable component of the development environment 10 determines at least one display data range, as shown in block 520. This may involve using the set of data items, the graphical element, and any other appropriate feature of the chart useful in determining appropriate data ranges. As part of the determination of at least one data range, the graphics subcomponent 20 may determine the data range needed for its graphics. For example, the graphic subcomponent may examine the data structure, the stored op codes, the data values, and/or the pixel values to report back a desired range. Typically the data parameter will provide information about the position of the graphic element and the pixel parameter will provide information about a characteristic or feature of the graphic element. However, either parameter may be used to specify either feature type. Note that in one embodiment, a data structure Is used to record the graphics control call and associated parameters. In other embodiments, a different data structure or no data structure is employed.

After determination of a display data range, method 400 may further comprise drawing the chart using the at least one display range, as shown in block 530. Drawing the graphic element may involve use of pixel-based and other display characteristics, for example the at least one pixel value parameter may be used to specify a box border width that Is used when drawing the box whose location is specified by the at least one data value.

Illustrative Embodiment Using a Data Drawing Canvas Component

A data drawing canvas component may be used in embodiments of the present invention to allow a developer to manipulate the contents of a chart using common drawing functionality and data coordinates instead of x and y pixel coordinates.

For example, a data drawing canvas may have a moveTo method that is similar to a moveTo method used in a traditional drawing API. Other examples include lineTo, drawRect, beginFill, and curveTo. A developer can use the data drawing canvas component and add new graphic element children to a chart, for example boxes, circles, lines, sprites, bitmaps, buttons, checkboxes, other charts, and virtually any child that can be used in a non-chart API.

The graphic objects defined for the canvas have functions that allow data value parameters. For example, a line To function could be defined:

public function lineTo(hDataValue:*, vDataValue:*):void;
The hDataValue and vDataValue parameters are mapped against the two axes of the chart and converted into pixel values before being drawn. Other graphics APIs may also be defined with similar parameter mappings.

A data drawing canvas may be defined as a retained mode graphics API, meaning that a line or other graphic drawn on the canvas in relation to one or more data value will stay in the same relation to the one or more data value even through changes to the displayed chart.

Adding components or other display objects to a data drawing canvas can be accomplished by invoking in any suitable way. For example adding components may be accomplished by calling addChild() function or by specifying a new object in declarative code.

A data drawing canvas may also utilize a constraint system in which constraints may be set by calling a function, for example an updateDataChild function on the data drawing canvas. Such a function could have a format similar to the following:

function updateDataChild(child:DisplayObject, dData-Constraints:Object): void

Parameters may be set using name/value pairs with the constraints values a chart developer selects. As an example, to bind the top right corner of a label to the position "California", 270, a developer may specify following:

```
var l:Label = new Label( );
l.text = "Last Month";
dataCanvas.addChild(l);
dataCanvas.updateDataChild(l, { top: 270, right: "California" } );
```

A data drawing canvas component may be used to draw graphics that require the developer to specify location and pixel dimensions. For example, a chart developer may wish to use the drawing API to draw a 10 pixel radius ellipse centered at the point "Wyoming", 150. Determining how such a graphic will be displayed may require being able to subtract 10 pixels from "Wyoming" after "Wyoming" has been converted to pixel coordinates. A data drawing canvas can handle this scenario in any suitable way. For example, an API that takes a data coordinate may also take a data coordinate/pixel offset pair. For example, in the present case, a developer would call the drawEllipse function:

dataCanvas.drawEllipse(["Wyoming",-10], [150,-10], ["Wyoming", 10], [150,10])
The data drawing canvas may convert each first value into pixels and combine each pair before it does its drawing.

The use of a data drawing canvas as described herein eliminates the need for custom chart graphics in a variety of circumstances. In certain embodiments, the data drawing canvas is further enhanced with custom elements, functions, and objects.

Illustrative Embodiment Using the Edges of a Chart in a Graphic

Figure 6:
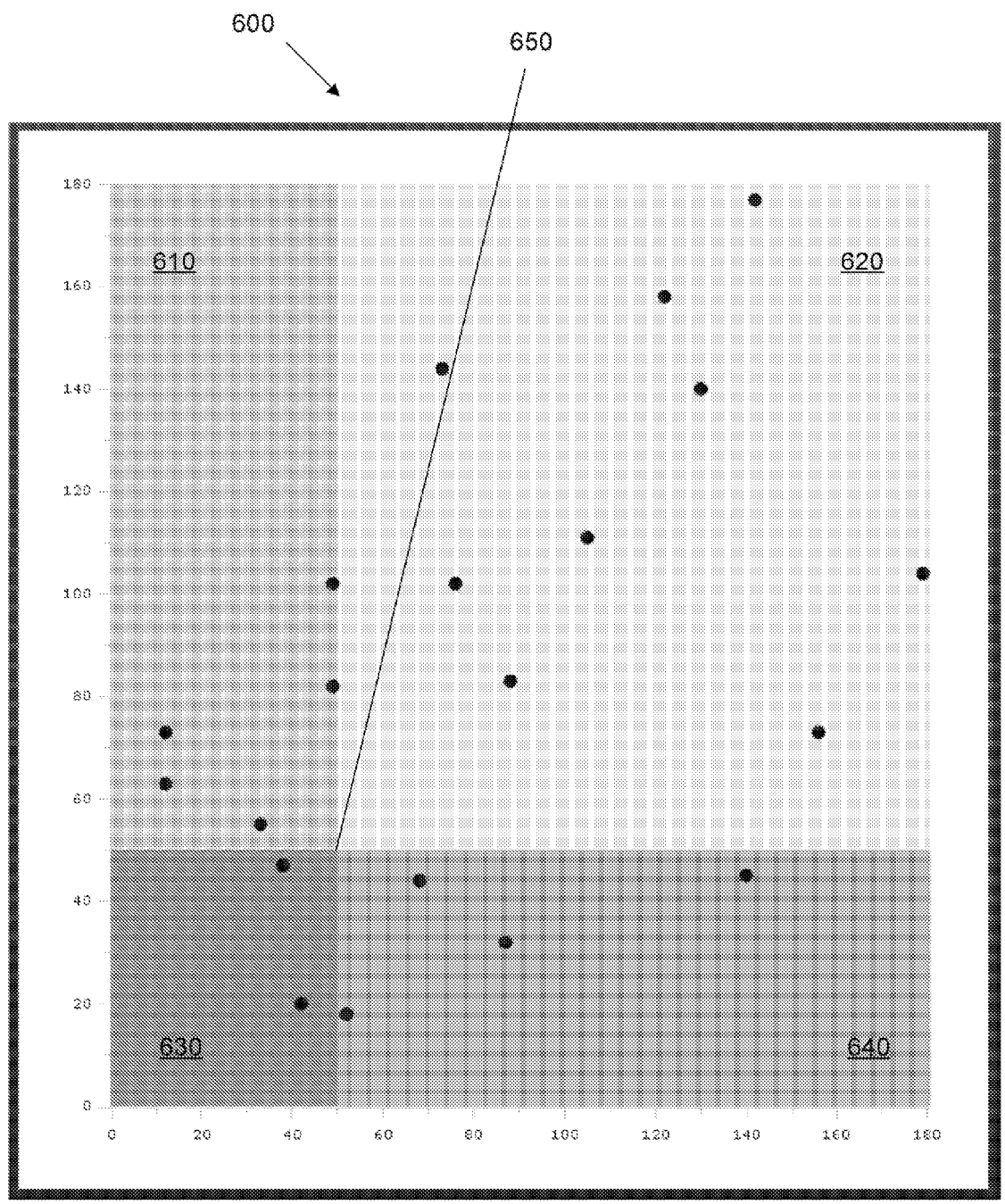
FIG. 6 illustrates an example of using the edges of a chart to define a graphic according to one embodiment of the present invention.
Figure 7:
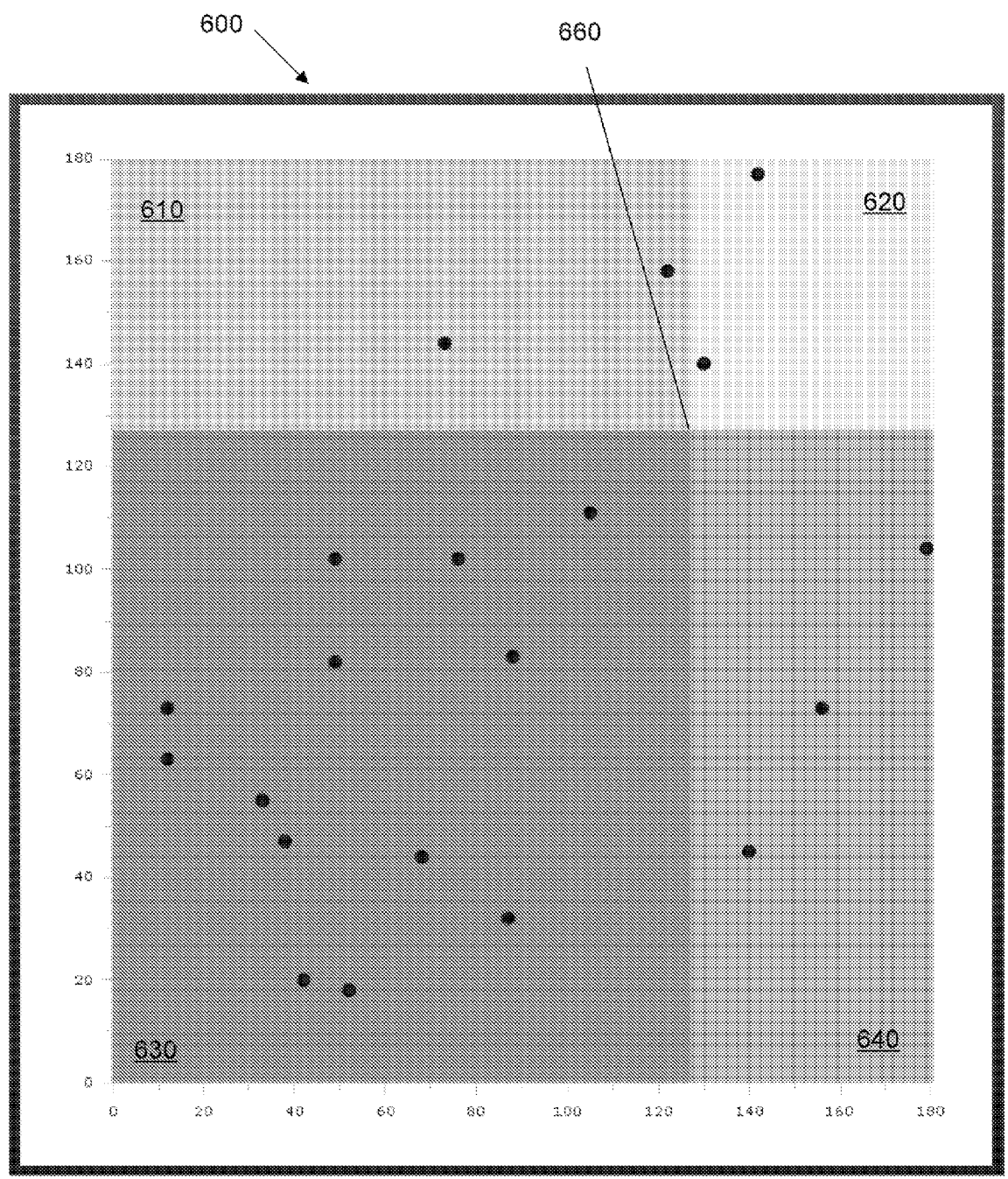
FIG. 7 further illustrates the example of FIG. 6 of using the edges of a chart to define a graphic according to one embodiment of the present invention.

FIGS. 6 and 7 illustrate an example of using the edges of a chart in a graphic according to one embodiment of the present invention. For many types of chart annotations, a developer intends to draw not to a particular data point, but instead to the edge of the chart. To accomplish this, special constants may be defined, for example constants that reflect the top edge, left edge, right edge, and bottom edge of a square chart. Additional constants may also be used and charts having different shapes may have differing edge constants.

In FIGS. 6 and 7, four quadrants 610, 620, 630, 640 are drawn in the background of the chart 600. In FIG. 6, each quadrant draws from the vertical and horizontal lines defined by the data point 650 (50,50), out to the edges of the chart. In FIG. 7, the quadrants are defined by a different data point 660.

Illustrative Embodiment of Labeled Quadrants

Figure 8:
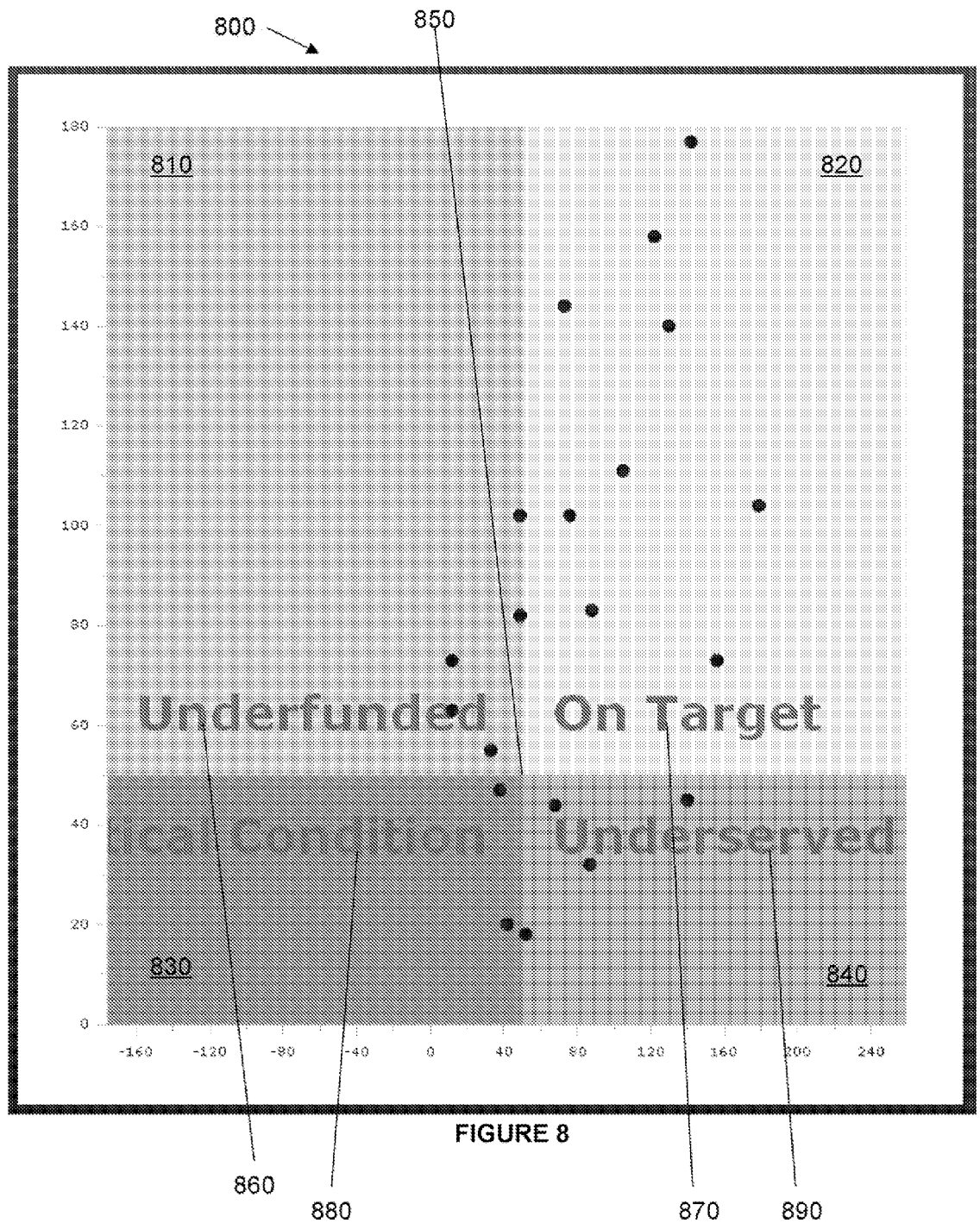
FIG. 8 illustrates an example of labeled quadrants according to one embodiment of the present invention.
Figure 9:
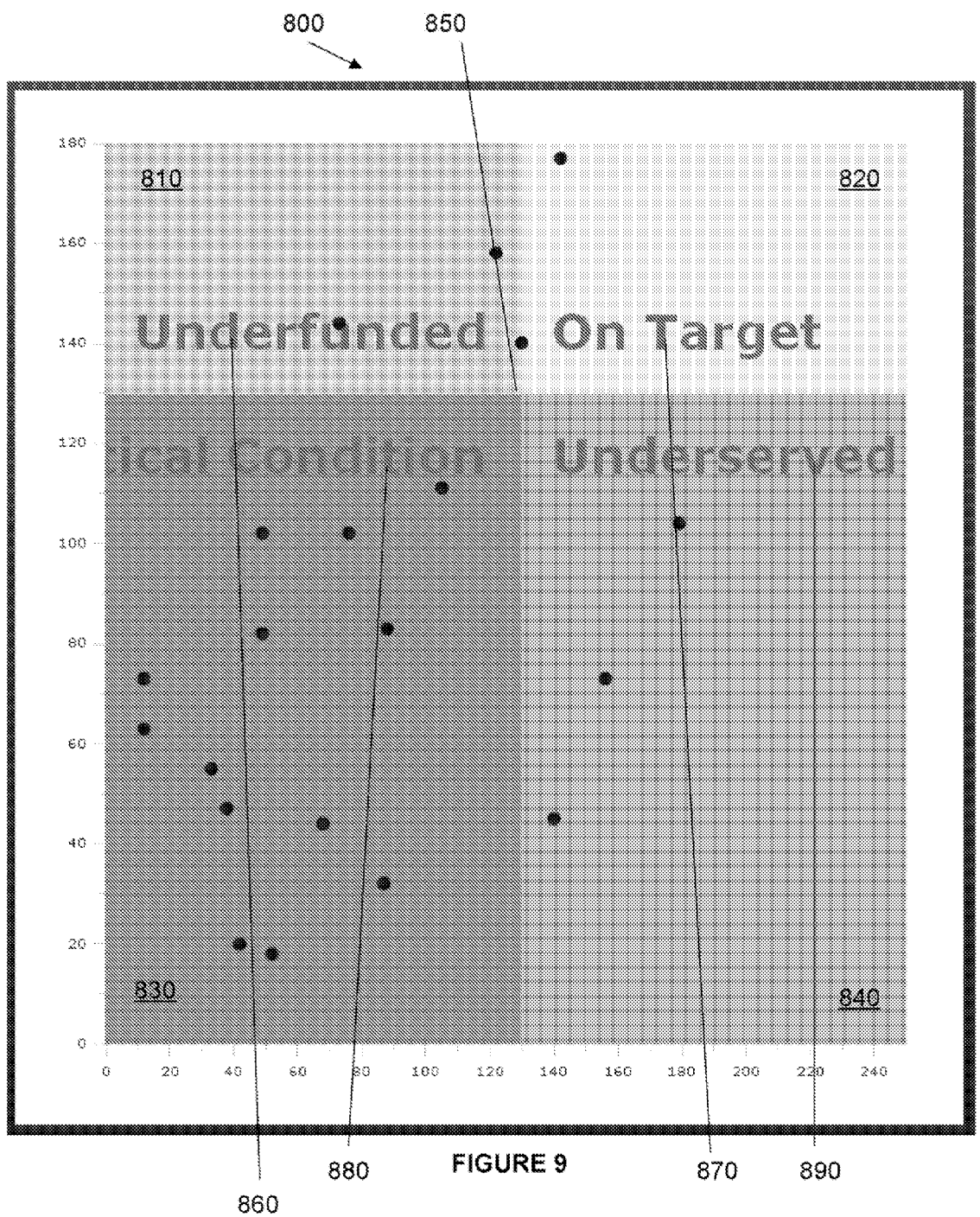
FIG. 9 further illustrates the example of FIG. 8 of labeled quadrants according to one embodiment of the present invention.

In FIGS. 8 and 9 illustrates an example of labeled quadrants according to one embodiment of the present invention. Quadrants 810, 820, 830, 840 are defined with each quadrant being drawn from the vertical and horizontal lines defined by the data point 850 (50,50), out to the edges of the chart. Each quadrant 810, 820, 30, 840 is also labeled, respectively, "Underfunded" 860, "On Target" 870, "Critical Condition" (880) and "Underserved" (890). These labels are bounded using constraints to the intersection data point 850.

In this example, the data labels are defined as children or subcomponents of a data drawing canvas object. Each data label subcomponent has a flag—"includeInRanges"—that indicates to the chart that the ranges automatically generated for the chart should be large enough to include the graphics and data set values drawn in the data canvas. The developer can select whether to select the flag for each label. In FIG. 8, the flag is set to "TRUE" for three of the four quadrants. Note that the "Critical Condition" 860 label is partially cut off because its location, was not used in determining the range of the canvas.

FIG. 9, illustrates a change to the data set that requires the chart to determine changed display ranges. Note that three of the labels 860, 870, 890 (the ones with the includeInRanges flag set to TRUE) are displayed, but that the fourth label 860 (that does not have its includeInRanges flag set to TRUE) is partially cutoff by the edge of the chart.

Illustrative Embodiment Using Dynamic Labels

Figure 10:
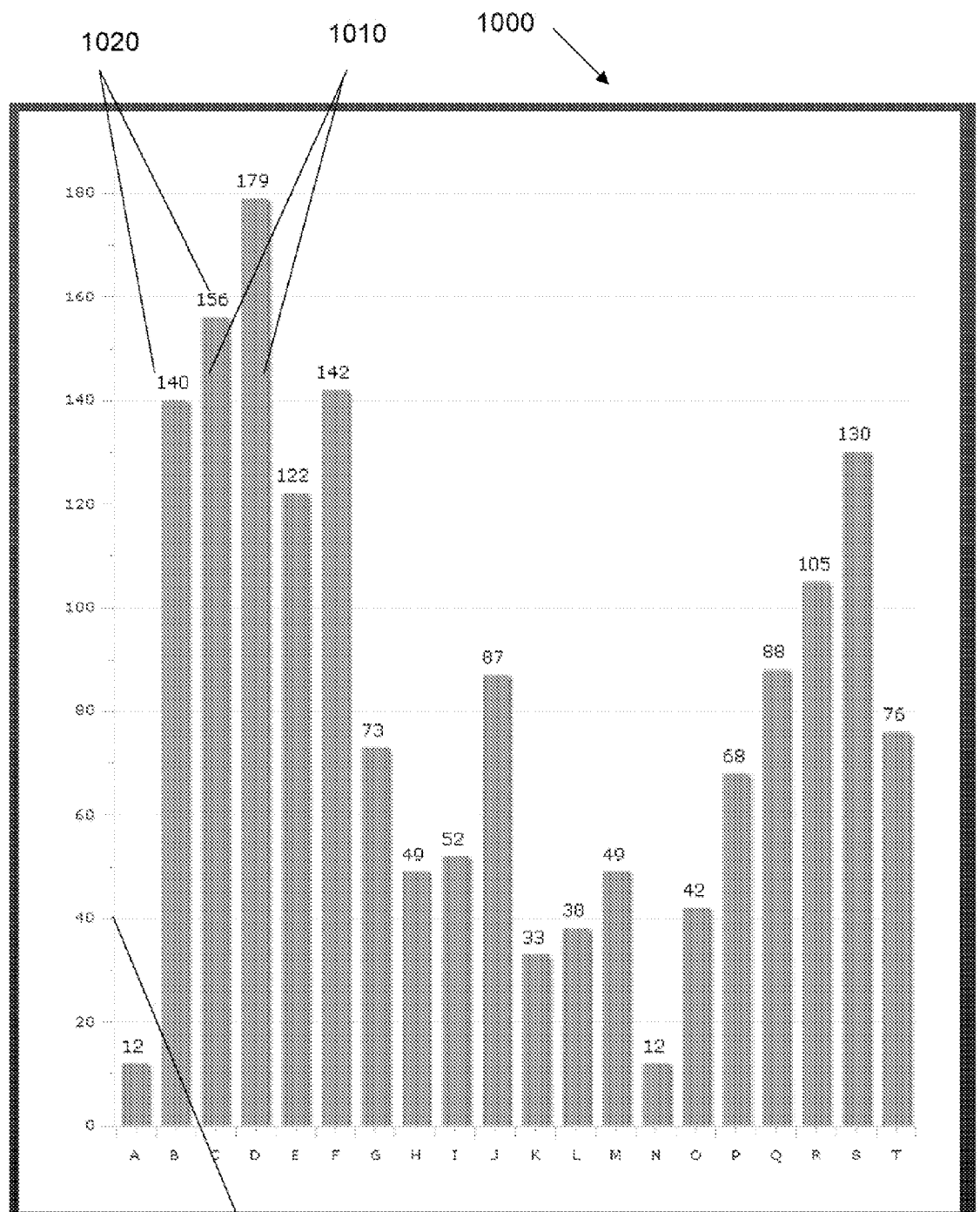
FIG. 10 illustrates an example of using dynamic label graphics according to one embodiment of the present invention.
Figure 11:
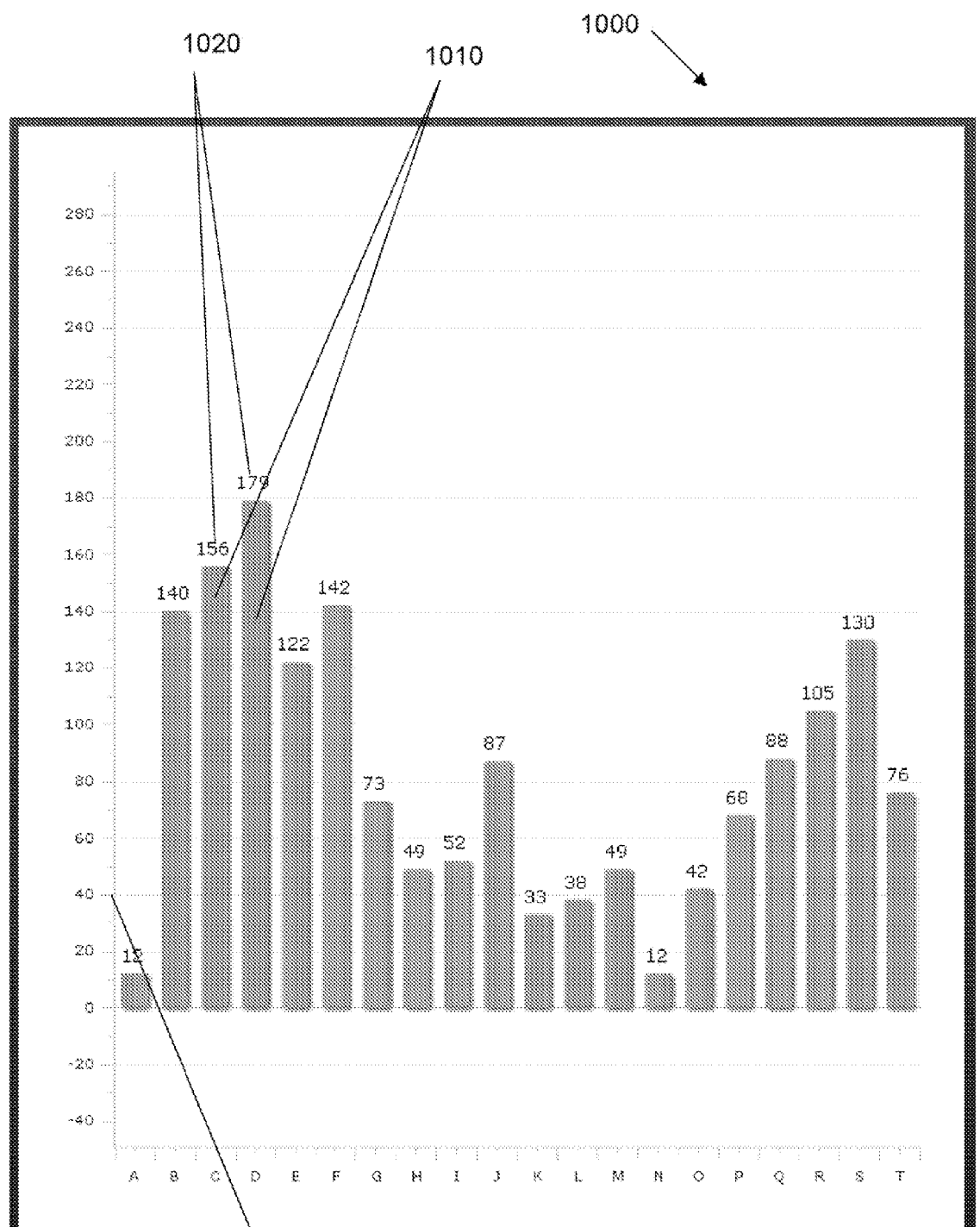
FIG. 11 further illustrates the example of FIG. 10 of using dynamic label graphics according to one embodiment of the present invention.

FIGS. 10 and 11 illustrate an example of using dynamic label graphics according to one embodiment of the present invention. A label on a column is a fairly common graphic customized in a chart. One embodiment of the present invention allows a developer to programmically create a label for every point in a data series. In FIG. 10 the bottom of each data label 1020 is positioned 5 pixels above each column 1010 and each label 1020 is centered on its column 1010. In FIG. 10, the vertical axis 1030 is changed and the column labels maintain their positions relative to the column tops.

Illustrative Embodiment Using Data Selection in a Chart

Figure 12:
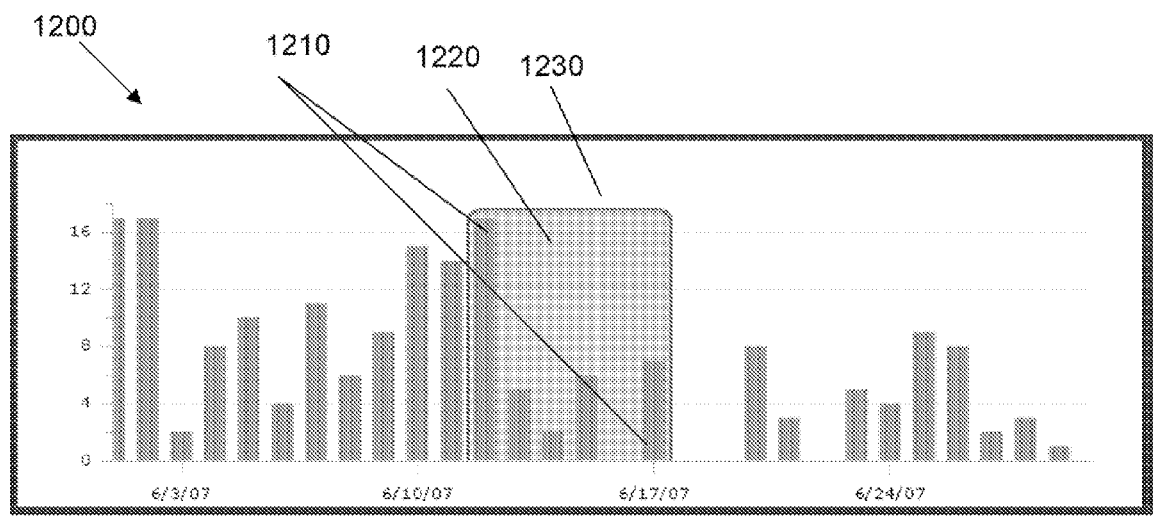
FIG. 12 illustrates an example of using data selection graphics according to one embodiment of the present invention.

FIG. 12 illustrates an example of using data selection graphics according to one embodiment of the present invention. In FIG. 12, a group of data representations 1220 is selected using data values and a pixel offset. A graphic 1220 showing the selection is drawn from the top of the chart 1200 to the bottom of the chart, but offset by 4 pixels downward. This gives a small gap 1230 at the top of the chart and hides the rounded corners at the bottom of the chart.

Illustrative Embodiment Using Drop Lines

Figure 13:
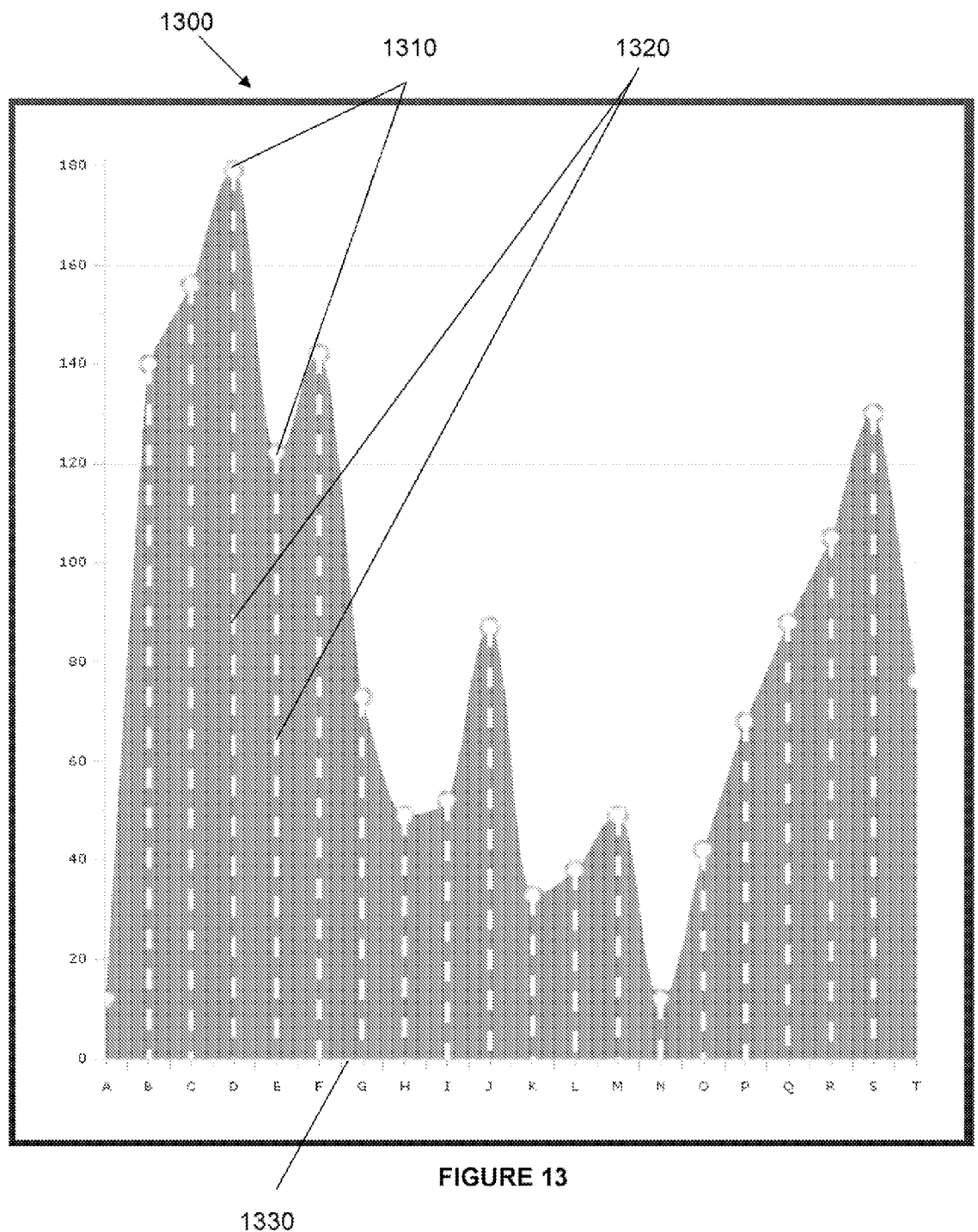
FIG. 13 illustrates an example of using drop line graphics according to one embodiment of the present invention.

FIG. 13 illustrates an example of using drop line graphics according to one embodiment of the present invention. The chart 1300 illustrates data point representations 1310 and added drop line graphics 1320 that are defined by a developer by specifying the data values associated with the displayed data point and the bottom edge constant, meaning that each drop line runs from the data point representation 1310 down to the bottom edge 1330, in this case the horizontal axis.

Illustrative Embodiment Referencing a Data Set Representation Position

Figure 14:
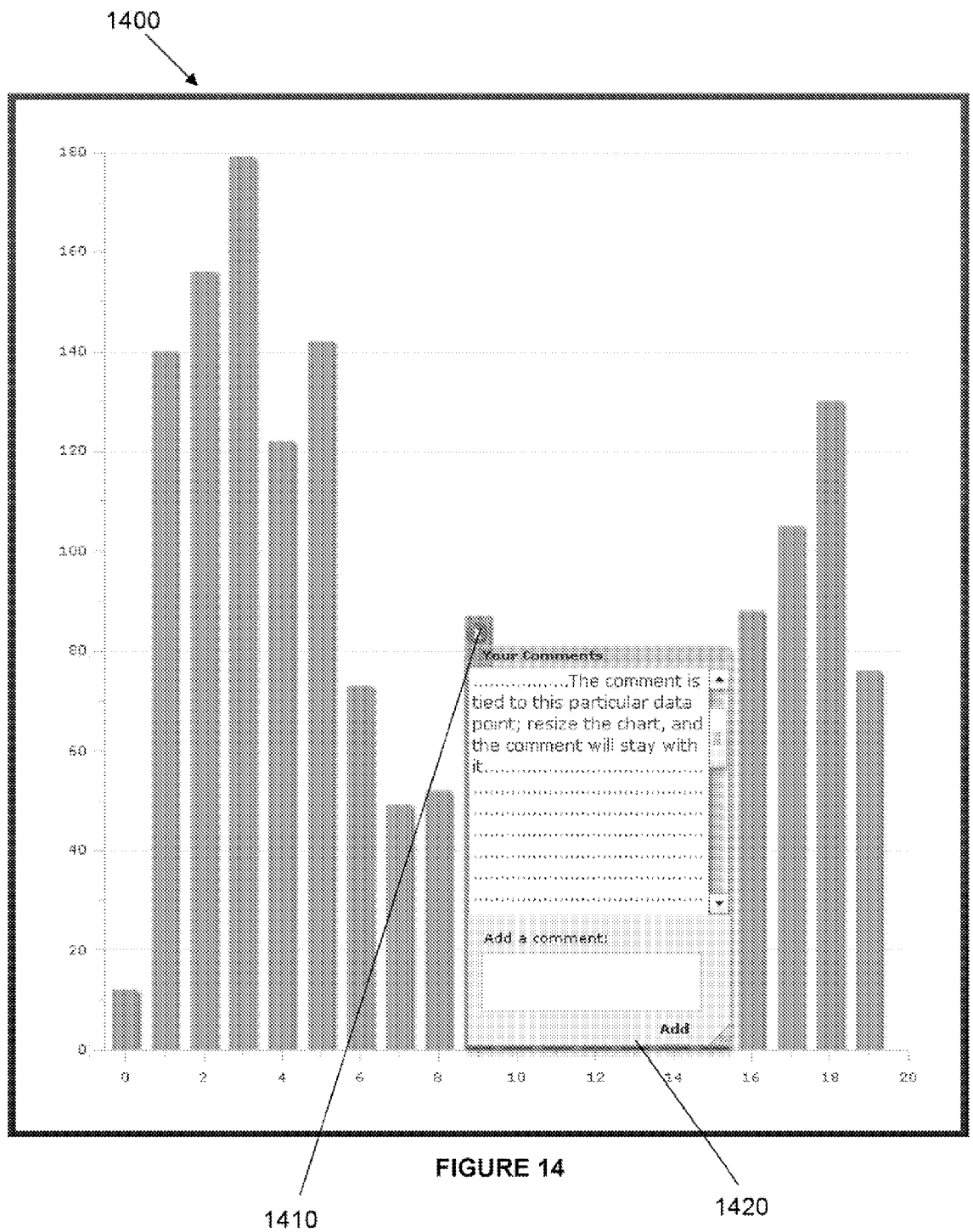
FIG. 14 illustrates an example of a, graphic positioned by reference to a particular data set representation according to one embodiment of the present invention.
Figure 15:
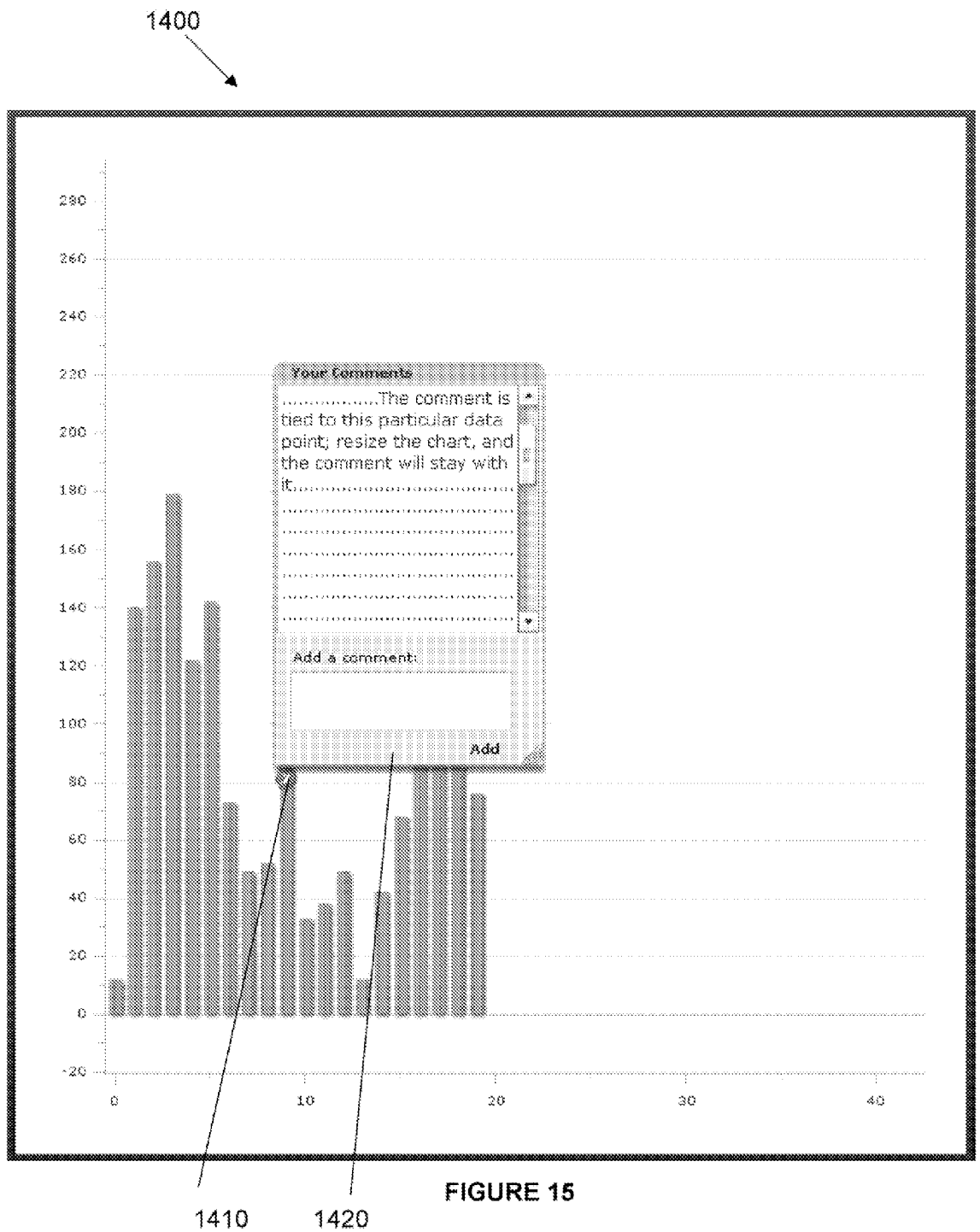
FIG. 15 farther illustrates the example of FIG. 14 of a graphic positioned by reference to a particular data set representation according to one embodiment of the present invention.

FIGS. 14-15 illustrate an example of a graphic positioned by reference to a particular data set representation position according to one embodiment of the present invention. The chart 1400 illustrates data point representations, including a particular data point representation selected for attachment of a selection graphic 1410 (appearing as an "x" in a circle") and a data box graphic or comment 1420. Upon change of the display, as shown in FIG. 15, the graphics 1410, 1420 are re-positioned in relation to the changed position of the column representing the selected data item. Embodiments of the present invention thus provide methods and systems for adding and/or editing comment-type graphical elements to a chart.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

That which is claimed:

1. A method comprising:
receiving, at a computer, a graphics control call to draw a graphical element in a chart displaying a set of data, the graphics control call comprising at least one data value parameter to specify the location of the graphical element in the chart, wherein the graphical element is not a representation of data of the set of data;
recording, at the computer, into a data structure at least one drawing operation associated with the graphics control call;
determining, at a processor of the computer, at least one display data range for displaying the set of data and the graphical element in the chart; and
causing, at the computer, the chart to be drawn with the graphical element using the at least one display range and the data structure.

2. The method of claim 1, further comprising receiving a chart control call specifying the display of the set of data in the chart.

3. The method of claim 1, wherein drawing the chart further comprises using the data structure to determine the location of the graphical element.

4. The method of claim 1, wherein drawing the chart comprises using the at least one drawing operation associated with the graphics control call recorded in the data structure to draw the graphical element.

5. The method of claim 1, wherein the chart comprises at least one axis and the at least one display range is a range of data values for the at least one axis.

6. The method of claim 5, wherein the at least one axis comprises a non-numeric axis value.

7. The method of claim 1, wherein the chart comprises a first axis and a second axis and the at least one display range comprises a first range of data values for the first axis and a second range of data values for the second axis.

8. The method of claim 1, further comprising:
receiving a change to the set of data;
determining at least one changed display data range reflecting the change to the set of data; and
causing a changed chart to be drawn using the at least one changed display data range and the data structure.

9. The method of claim 1, wherein the graphics control call comprises a declarative language command.

10. The method of claim 1, wherein the graphics control call comprises a function call.

11. The method of claim 1, further comprising:
receiving a change to the graphics control call;
recording into a changed data structure at least one drawing operation associated with the change to the graphics control call;
determining at least one changed display data range using the change to the graphics control call; and
drawing a changed chart using the at least one changed display range and changed data structure.

12. The method of claim 1, wherein the graphical element is a box.

13. The method of claim 1, wherein the graphical element is a comment.

14. A method comprising:
receiving, at a computer, a graphics control call to draw a graphical element in a chart displaying a set of data, the graphics control call comprising at least one data value parameter and at least one pixel value parameter, the at least one data value parameter and the at least one pixel value parameter used to specify display of the graphical element in the chart, wherein the graphical element is not a representation of data of the set of data;
determining, at a processor of the computer, at least one display data range for display of the set of data and the graphical element in the chart; and
drawing, at the computer, the chart using the at least one display range.

15. The method of claim 14, wherein the at least one data value parameter specifies a location of the graphical element in the chart.

16. The method of claim 15, wherein the at least one data value parameter specifies a corner of the graphical element in the chart.

17. The method of claim 14, wherein the at least one pixel value parameter specifies a size of the graphical element in the chart.

18. The method of claim 17, wherein the at least one pixel value parameter specifies a width or height of the graphical element in the chart.

19. The method of claim 14, wherein the at least one pixel value parameter specifies a diameter of the graphical element in the chart.

20. The method of claim 14, wherein the at least one pixel value parameter specifies a buffer around the graphical element in the chart.

21. A non-transitory computer-readable medium on which is encoded program code, the program code comprising:
   program code for receiving a graphics control call to draw a graphical element to a chart displaying a set of data, the graphics control call comprising at least one data value parameter used to specify the location of the graphical element in the chart, wherein the graphical element is not a representation of data of the set of data;
   program code for recording into a data structure at least one drawing operation associated with the graphics control call;
   program code for determining at least one display data range for display of the set of data and the graphical element in the chart; and
   program code for drawing the chart using the at least one display range and the data structure.

22. A computer system comprising:
   an interface that receives a graphics control call to draw a graphical element to a chart displaying a set of data, the graphics control call comprising at least one data value parameter used to specify the location of the graphical element in the chart, wherein the graphical element is not a representation of data of the set of data;
   a renderer for drawing the chart, the renderer capable of:
      recording into a data structure at least one drawing operation associated with the graphics control call;
      determining at least one display data range for display of the set of data and the graphical element in the chart; and
      drawing the chart using the at least one display range and the data structure.

23. A method comprising:
   determining, at a processor of a computer, at least one display data range for displaying a set of data and a graphical element, wherein the graphical element is not a representation of data of the set of data; and
   causing, at the computer, a chart to be drawn with the set of data and the graphical element using the at least one display range and a data structure associated with the graphical element, the data structure comprising at least one drawing operation associated with the display of the graphical element using a reference to at least one chart data point.

24. A non-transitory computer readable medium comprising a data structure for use in drawings graphics into a chart of data, the data structure comprising an identification of a graphical element and an identification of at least one drawing operation associated with display of the graphical element using a reference to at least one chart data point wherein the graphical element is not a representation of the data.

* * * * *